No. 754,970. PATENTED MAR. 22, 1904.
E. B. CLARK.
ATTACHMENT FOR LINOTYPE MACHINES.
APPLICATION FILED JUNE 15, 1903.
NO MODEL. 5 SHEETS—SHEET 1.
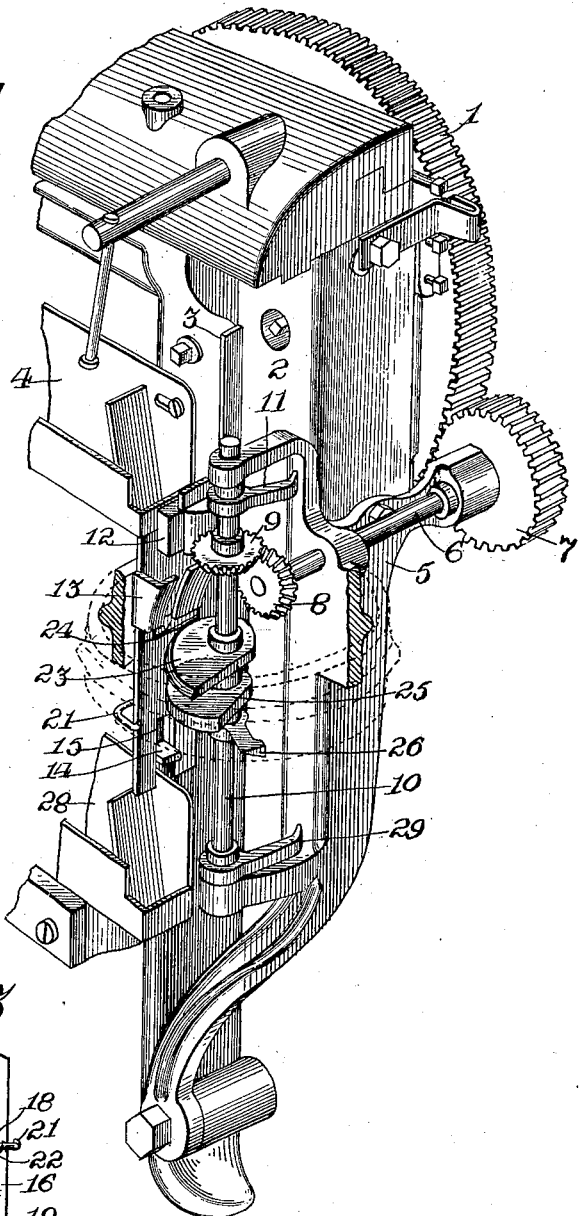
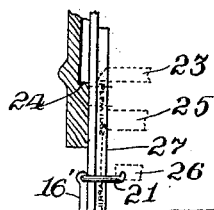
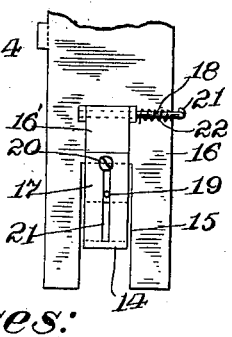
Witnesses:
Geo B Rowley
F. N. Barber
Inventor:
E. B. Clark
By Wm L. Pierce
Attorney.

No. 754,970. PATENTED MAR. 22, 1904.
E. B. CLARK.
ATTACHMENT FOR LINOTYPE MACHINES.
APPLICATION FILED JUNE 15, 1903.
NO MODEL. 5 SHEETS—SHEET 2.
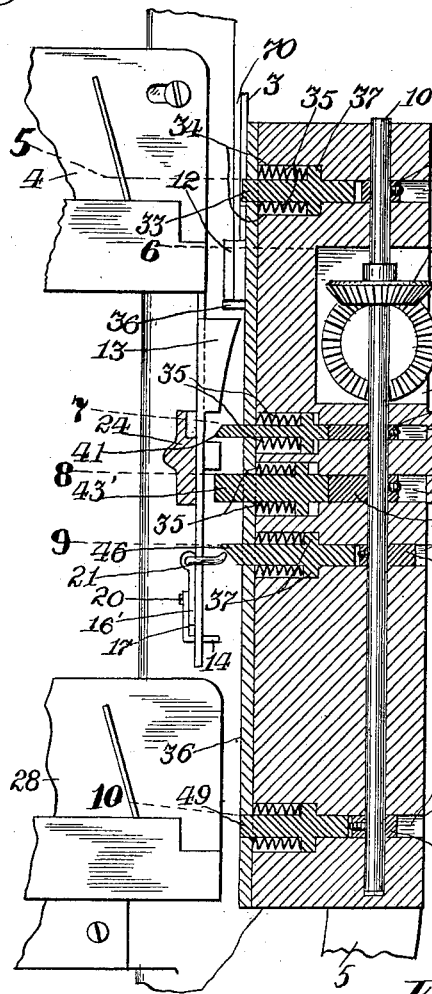
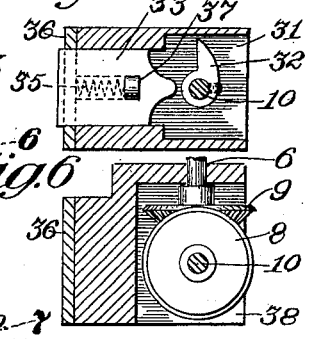
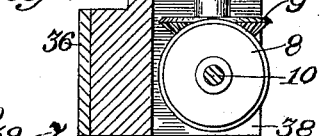
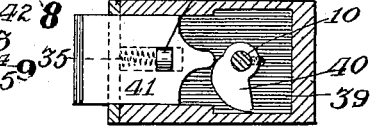
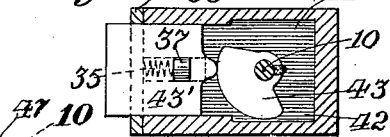
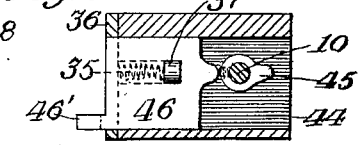
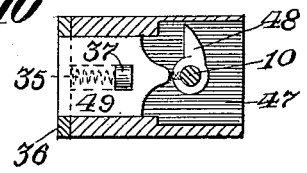
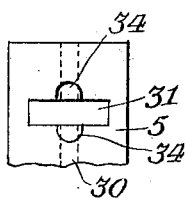
Witnesses:
Geo. B Rowley,
F. N. Barber
Inventor;
E. B. Clark
By Wm L. Pierce.
Attorney.

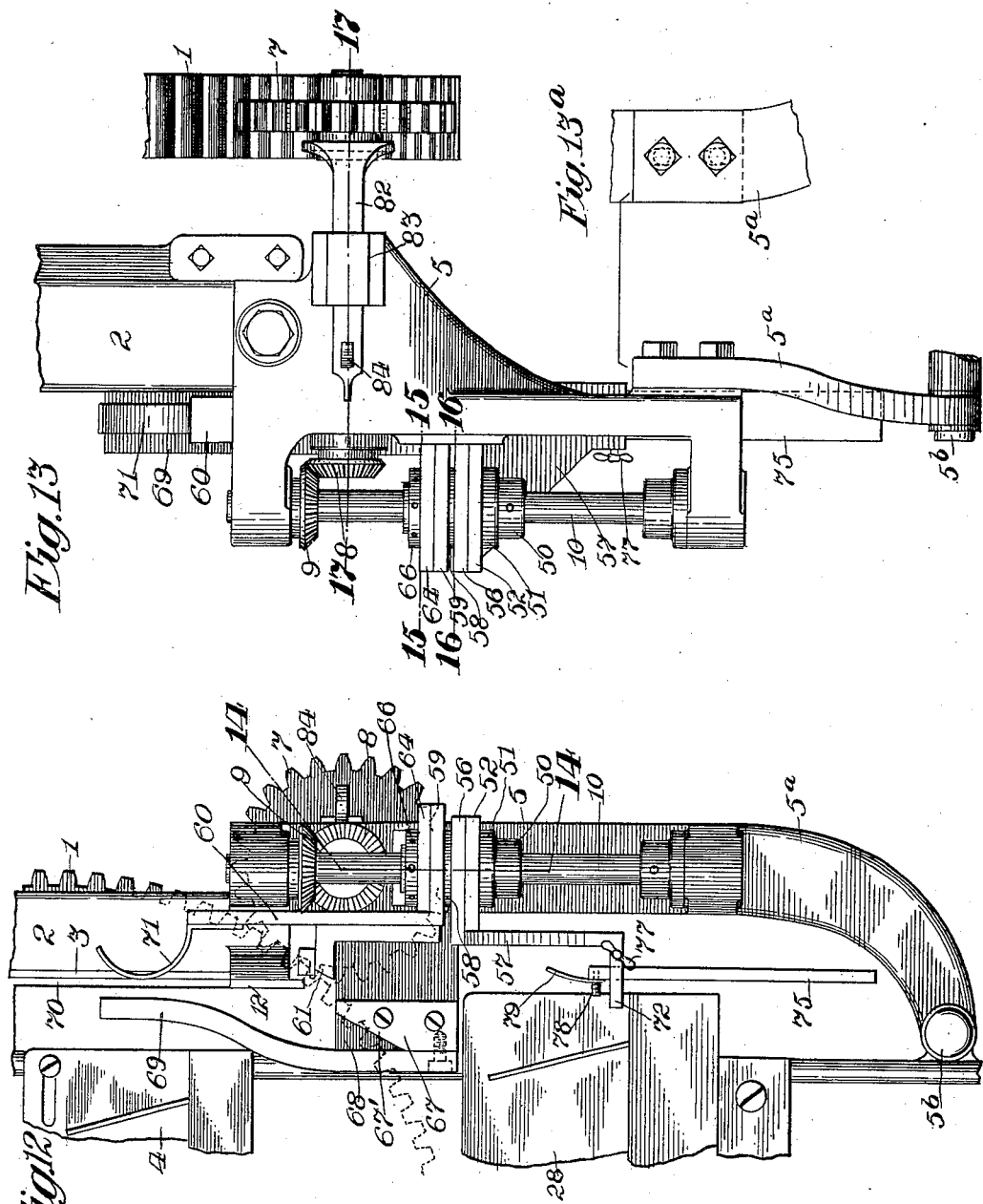

No. 754,970. PATENTED MAR. 22, 1904.
E. B. CLARK.
ATTACHMENT FOR LINOTYPE MACHINES.
APPLICATION FILED JUNE 15, 1903.
NO MODEL. 5 SHEETS—SHEET 4.
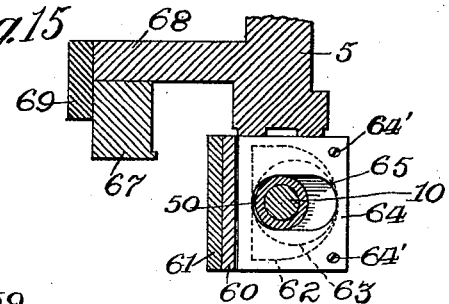
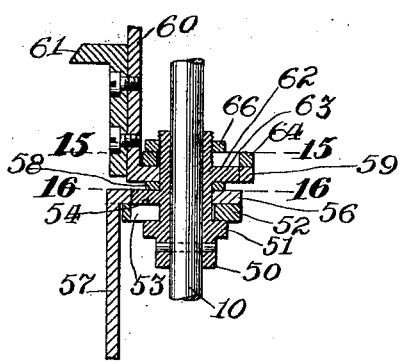
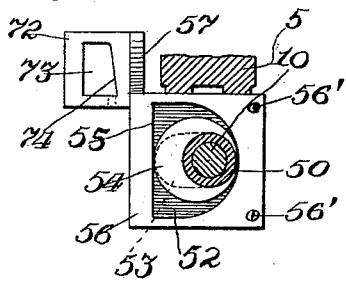
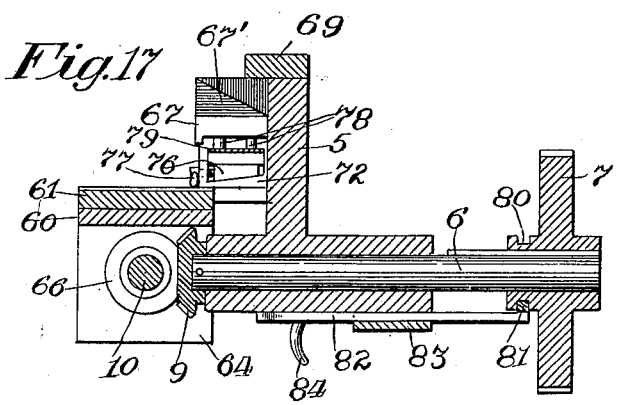
Witnesses:
Geo. B. Rowley.
F. N. Barber
Inventor:
E. B. Clark
By Wm. L. Pierce,
Attorney.

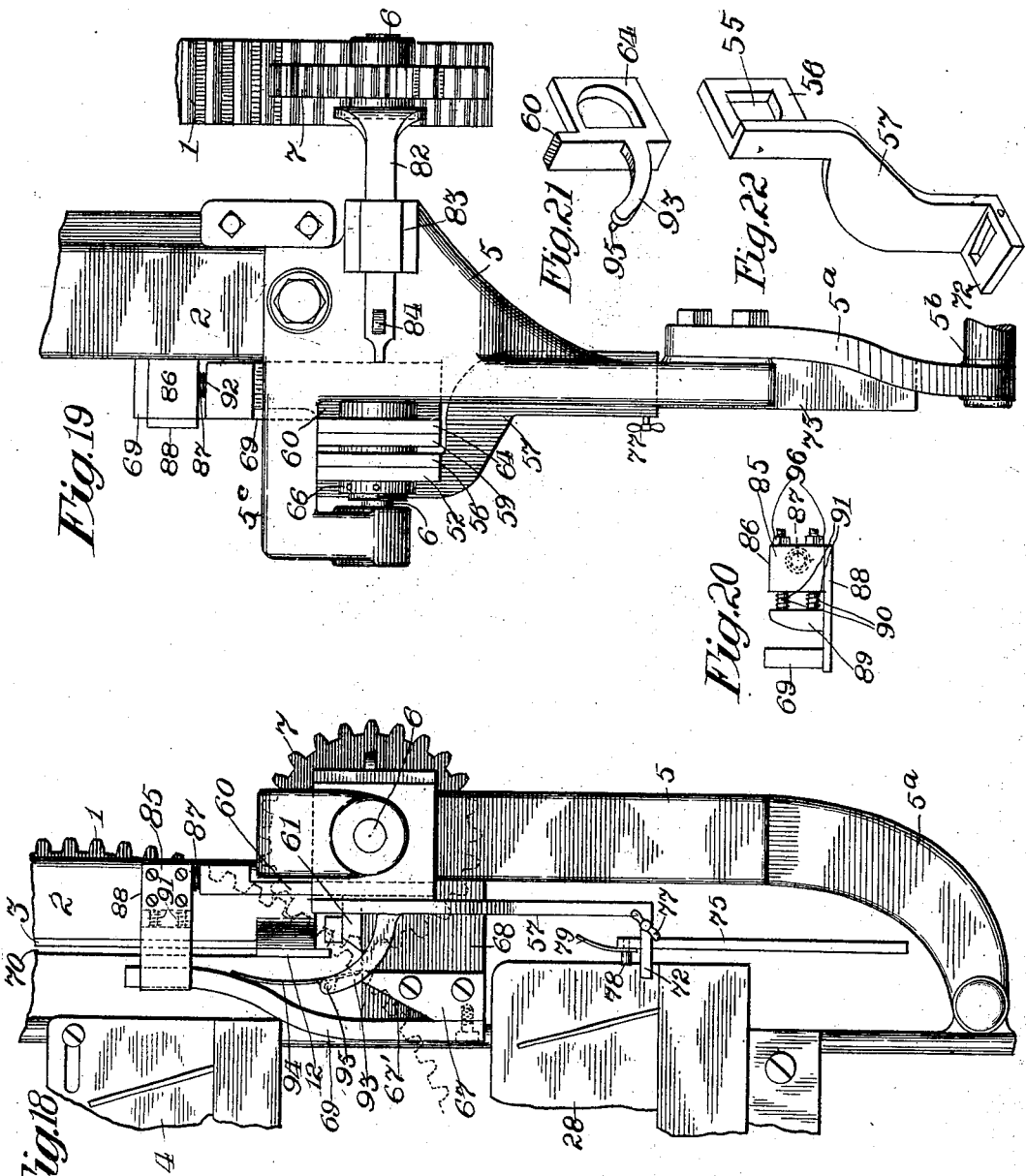

No. 754,970. Patented March 22, 1904.

UNITED STATES PATENT OFFICE.

EDWARD B. CLARK, OF PITTSBURG, PENNSYLVANIA, ASSIGNOR OF PART, BY DIRECT AND MESNE ASSIGNMENTS, TO IMPERIAL MACHINE COMPANY, OF PITTSBURG, PENNSYLVANIA, A CORPORATION OF PENNSYLVANIA, AND SAMUEL B. WHINERY, OF PITTSBURG, PENNSYLVANIA.

ATTACHMENT FOR LINOTYPE-MACHINES.

SPECIFICATION forming part of Letters Patent No. 754,970, dated March 22, 1904.

Application filed June 15, 1903. Serial No. 161,427. (No model.)

*To all whom it may concern:*

Be it known that I, EDWARD B. CLARK, a citizen of the United States, residing at Pittsburg, in the county of Allegheny and State of Pennsylvania, have invented or discovered new and useful Improvements in Attachments for Linotype-Machines, of which the following is a specification.

In the accompanying drawings, which make part of this specification, Figure 1 is a perspective of a portion of a Merganthaler linotype-machine with my improvements thereon, portions being broken away; Fig. 2, a sectional view showing particularly the rest for the linotypes during the cutting thereof; Fig. 3, an elevation of the left-hand side of the lower part of Fig. 2 looking toward the right; Fig. 4, a view, partly in elevation and partly in vertical section, showing a second form of my invention; Figs. 5, 6, 7, 8, 9, and 10, sections, respectively, on the correspondingly-numbered section-lines of Fig. 4; Fig. 11, a detail of the opening 31 in which the sliding pusher 33 shown in Fig. 4 operates; Fig. 12, a front elevation of a third form in which my invention may be embodied; Fig. 13, a side elevation of the same; Fig. 13ª, a side view of the support for the bracket 5; Fig. 14, a vertical section of the cutter and the cams operating the same and the linotype-rest, the section being taken on line 14 14 of Fig. 12; Figs. 15 and 16, horizontal sections on the lines 15 and 16, respectively, of Figs. 13 and 14; Fig. 17, a horizontal section on line 17 of Fig. 13; Fig. 18, a front elevation of a fourth form which my invention may assume; Fig. 19, a side elevation of the same; Fig. 20, a detail plan view of the top pusher for the linotypes; Fig. 21, a fragment in perspective, showing the means for operating the knife and the apron 94, and Fig. 22 a detail in perspective of the mechanism for operating the rest-bar 75.

My invention relates to linotype-machines, and more particularly to an attachment therefor by means of which the upper ends of the linotypes may be cut off or trimmed to the desired length.

When linotypes are to be trimmed, they are always removed from the composing-sticks and taken to a hand-operated cutter, by which they are trimmed one by one. This is a very slow operation and entails mistakes and delays. By my improvements the machine can be set to cut the linotypes to any length, and after the cutting they will all be pushed over onto the composing-stick without any necessity of their removal except to make up the galleys and forms.

My invention is particularly designed to cut off the blank ends of linotypes when the lines of type thereon are shorter than the standard length or when it is desired to lessen the standard distance between columns of printed matter.

Referring to Figs. 1, 2, and 3 of the drawings, 1 designates the mold-wheel of the usual Merganthaler machine, the details thereof not being shown, since the construction of the casting-machine forms no part of my invention and is well known. 2 is a portion of the face or frame of the machine, having the usual flange 3, from behind which the linotype is pushed from the mold-wheel through the slot 70 (see Fig. 12) toward the front and in line with the composing-stick 4. All of this mechanism is old and in common use and needs no further description. To the side of the portion 2 of the face of the machine I fasten a bracket 5, which supports my improvements. A horizontal shaft 6 has bearings in this bracket and carries at one end a spur-wheel 7, meshing with teeth on the casting-wheel 1, and at the other end a bevel gear-wheel 8, meshing with bevel gear-wheel 9 on the vertical shaft 10. This shaft stands slightly to the right of the flange 3 and carries near its top opposite the stick 4 a pusher 11, which at each rotation of the shaft 10 shoves any linotype resting on the ledge 12 onto the stick 4 if the latter be shoved up against the ledge. When the stick 4 is spaced from the ledge 12, as shown in Fig. 1, the pusher then serves to shove the linotypes off from the ledge, whence they drop down between the latter and the stick and into the chute 13. The linotypes so shoved off the ledge 12 are stopped by the horizontal finger or rest 14, which projects through the slot 15 in the guide-plate 16 into the path of the linotypes. The finger or rest 14 has a vertical portion 17, which is attached to the plate or arm 16', supported on the rock-shaft 18. The arm 16 is provided with a pin 19 and a set-screw 20, which are in the vertical slot 21 in the portion 17 of the rest 14. The pin 19 serves to guide and hold the rest 14 in the proper position, while the set-screw 20, which has the same functions as the pin 19, in addition clamps the rest to the arm 16, so as to maintain the rest at the desired vertical position. The rock-shaft 18 is provided with a finger 21, which extends back so as to lie on the same side of the plate 16 as the rest 14 lies, but not in the path of the linotypes. The rock-shaft has a spring 22 for returning the rest to the position shown in the drawings after it has been withdrawn from that position, as hereinafter explained. On the shaft 10 is an eccentric cutter 23, which sweeps at each revolution across the space occupied by the linotype resting on the finger 14 and cuts off or trims the top end of the same. The cutter coöperates with the fixed cutting edge 24 in the plate 16. 25 is a cam-shaped plate on the shaft 10 and serves during the cutting operation just described to clamp the linotype securely against the plate 16. 26 is a tripping-arm, wedge-shaped in cross-section, which is fixed to the shaft 10 and is so timed to the cutting and clamping operation as to engage with the upper side of the arm 21 as soon as the cutting has been completed and cause the rest 14 to be withdrawn from beneath the linotype, (marked 27 on Fig. 2.) After the finger has been withdrawn so as to permit the linotype to drop it falls into the stick 28, where it is engaged by the pusher-arm 29 on the shaft 10. The arm 29 is so timed as to push each linotype out of the way of the linotype next to be trimmed and dropped.

Referring now to Figs. 4 to 11, inclusive, the bracket 5 is made much thicker than in Fig. 1, so as to receive the shaft 10 and the various elements which act on the linotypes. The shaft 10 stands vertically in the hole or bearing 30, intersected by the horizontal slots 31, 38, 39, 41, 44, and 47. In the slot 31 is a cam 32, secured adjustably to the shaft 10 and a sliding pusher 33, whose function is the same as that of pusher 11 of Fig. 1. Lying in slots 34 on either side of the pusher 33 are expansion-springs 35, which are seated between the front face 36 of the bracket 5 and the lugs 37 on the pusher 33 and in the slots 34. The springs return the pusher to its retracted position, as shown in Figs. 4 and 5. In the slot 38 are the bevel-wheels 8 and 9, which are the same as in Fig. 1. In the slot 39 is the cam 40, adjustably fixed to the shaft 10 and the sliding cutter 41, forced outwardly by the cam 40 and retracted by the springs 35 acting on the lugs 37. In the slot 42 and on the shaft 10 is a cam 43 and a sliding clamping-plate 43', forced outwardly by the cam 43 and retracted by the springs 35. In the slot 44 and on the shaft 10 is a cam 45 and a sliding plate 46, having a beveled tripping-finger 46', forced out by the cam into contact with the arm 21 and retracted by the springs 35. In the slot 47 is a cam 48 and a sliding pusher 49, forced out by the cam 48 and retracted by the springs 35. Each of the cams has a set-screw by which it can be adjusted on the shaft 10 in order that the several sliding parts actuated by the cams may be operated in the proper order and at proper intervals.

The operation of the mechanism shown on Figs. 4 to 11 is as follows: Each linotype is shoved out in the usual way on the ledge 12 next to the flange 3. If the stick 4 is against the ledge, each revolution of the shaft 10 will cause the cam 32 to move to the left and push the linotype onto the stick. If the stick 4 stands as shown in Fig. 4, the linotype will drop down through the chute 13 and come to rest on the finger 14. The cam 42 then shoves the clamp 43' against the linotype and holds it between itself and the plate 16. As soon as the linotype is tightly clamped the cam 40 actuates the cutter 41, which trims the top of the linotype. If the knife be properly timed, the clamp may be omitted, if preferred, as the knife will hold the linotype. The clamps and the cutter now retire, and the trip-finger 46' on the plate 46 moves forward and engages the arm 21 and swings it down. The swinging of the arm 21 moves the rest or finger 14 from under the linotype, which thereupon drops down into the end of the stick 28, where the cam 48 causes the pusher to shove the linotype in the stick 28 and out of the way of the next linotype. It is not necessary to use the upper stick 4, since if it is not desired to cut the linotypes the finger 14 may be taken off or lowered, so that the cutter will pass above the linotypes, and the stick 28 is used.

Referring now to Figs. 12 to 17, the shaft 10 does not carry anything shown on the two forms of the invention hereinbefore described except the gear-wheel 9. The shaft 10 has keyed thereon the sleeve 50, having the annular shoulder 51, on which rests the plate 52, having in it a slot 53. The sleeve 50 carries a cam 54, which rotates in the D-shaped hole 55 in the upper horizontal member 56 of the angle-plate 57. The member 56 and the plate 52 are fastened together by screws 56'. A washer 58 separates the cam 54 and the horizontal member 59 of the angle-plate 60, to whose vertical member is removably secured the knife 61. The member 59 has a D-shaped slot 62, in which rotates the cam 63. On the cam 63 is a plate 64, having the slot 65. The member 59 and plate 64 are secured together by screws 64'. All the parts 52, 54, 58, 63, and 64 are strung on the sleeve 50 and secured thereon by the nut 66, which screws on the sleeve and down upon the plate 64. The plates 52 and 64 travel with the members 56 and 59, respectively, and bear against the bracket 5, as shown, and keep the cutter 61 and the plate 57 from sliding forward or twisting. The stationary cutter 67 is secured by screws to the front side of the arm 68 of the bracket 5 by screws, as shown on Fig. 12. The top of the cutter 67 is beveled at 67' on the side farthest from the cutter 61 to provide an incline or chute for the portions of the linotypes cut off. Secured to the side of the cutter 67 below the bevel is an upstanding guard-arm 69, which stands about the thickness of a linotype distant from the slot 70, out of which they are forced from the machine. The upper end of the plate 60 carries a spring pusher or finger 71, which stands normally flush with the side of the slot 70 opposite the arm 69. The lower horizontal member 72 of the angle-plate 57 has a hole 73 in it, one side 74 thereof being inclined. The vertical rest-bar 75 is clamped in the hole 73 by means of the wedge 76, actuated by the screw 77. The bar 75 carries at its top two rest-pins 78, upon which the linotypes rest while being cut. An apron or guide 79 is fastened on the top of the bar to guide the linotypes to the pins. The bracket 5 is supported on a curved arm 5ª, bolted to the bracket and standing on the pin 5ᵇ on the machine-frame. The wheel 7 is splined on the shaft 6, as shown on Fig. 17, and its hub has a groove 80, in which a projection 81 on the slide-bar 82 fits. The bar 82 slides in the channel-bearing 83 on the bracket 5 and has the finger-piece 84. The lower end of the plate 57, as well as the cutters 61 and 67, stands opposite the position which the linotypes assume when being cut, and as the shaft 10, which carries the members 56 and 59, which carry the said cutters, is not opposite said position of the linotypes the said members are necessarily offset, as shown in Fig. 13, in order that the cutters may coöperate. The operation is as follows: A linotype is shoved out of the slot 70 in the usual way onto the ledge 12. The cam 63 then pushes the pusher or finger 71 against the linotype, which is pushed off from the ledge 12 and clamped between the finger 71 and the arm 69, the arm 69 preventing the same from tipping over too far and causes the linotype to stand vertical. When the finger 71 retires, the linotype immediately falls down upon the rest-pins 78, which the cam 74 has advanced into its path. After the spring 71 has moved from in front of the slot 70 another linotype will be pushed out of said slot upon the ledge 12. The cam 64 then moves the cutter 61 toward the linotype now standing on the pins 78 and the spring 71 against the linotype on the ledge 12. As soon as the cutter 61 engages the lower linotype the cam 54 begins to retire the pins 78, and when the linotype has been severed the pins, as well as the member 72, have already been wholly withdrawn from under the linotype, which falls down upon the stick 28. In the meantime the upper linotype has been clamped between the fingers 71 and the arm 69. The cam 54, which is set to move the rest slightly in one direction before the cam 64 moves the finger 71 and cutter 61 in the opposite direction, then by means of the end of the member 72 pushes the trimmed linotype along the stick 28, the position being about that shown in Fig. 12. The pins 78 are now in position to catch the upper linotype as soon as the spring 71 moves back, whereupon the operation just detailed is repeated. The lengths of the several linotypes can be adjusted in an obvious manner by means of the wedge 76 and the screw 77. In order that the front of the machine may be swung down in the usual manner, the bar 82 must be pulled back by the finger-pull 84 so that the wheels 1 and 7 will be disconnected, as the horizontal straight teeth of the wheels would not permit the movement of the wheel 7 in an arc.

Referring now to Figs. 18 to 20, the reference-numerals are the same as on the other figures so far as the parts are the same. In Figs. 18 and 19 the shaft 10 is not used, and the parts strung on the shaft 10 are on the shaft 6. The member 56 and 59 and the plates 52 and 64 are guided on the under side of the arm 5ᶜ on the bracket 5, and these members and plates are vertical instead of horizontal, as in Figs. 12 and 13; but they nevertheless carry the same elements in both arrangements. In Figs. 18 to 20 I have somewhat modified the clamping member which holds the linotype against the arm 69. The bar 60 carries at its top a horizontally-pivoted pusher 85, which normally stands opposite the slot 70 and at a right angle thereto and against the edge of the arm 69, as shown on Fig. 20. The pusher 85 consists of a block 86, having pivotal movement on the pin 87, an arm 88, attached by screws to the side of the block, and a slidable pusher-bar 89. The latter is mounted on two horizontal pins 90, slidable in the block 86. Springs 91, surrounding the pins and lying between the block 86 and the bar 89, hold the bar normally in line with the right-hand edge of the slot 70 and permit the cutter to move to the left after the linotypes are clamped. The bar is slightly rounded, as shown, in order to guide the linotypes into the space between it and the arm 69. In case a linotype should be forced out of the slot 70 before the angle-plate 60 and parts connected thereto have returned to their normal position the linotype will engage with the back of the pusher 85 and swing it on the pin 87. This insures that no damage will be done. A spring 92 returns the pusher to its normal position. The position of the pusher or bar 89 may be adjusted by the nuts 96, screwed thereon, against the side of the block 86 opposite the bar 89. In order to insure the delivery of the linotype to the cutting side of the cutter 67, I provide the cutter-carrying bar 60 with an arm 93, which carries the curved guide-apron 94, pivoted to the arm at 95 and secured at its upper end to the arm 69. When the cutters 61 move forward to cut off a linotype, the bottom of the apron is pushed to the left to allow the waste metal to escape down the chute 67'. When the cutter returns and the bar 89 has released the clamped linotype, the apron will push or guide it so that it will fall upon the pins 78.

Although I have shown several specific mechanisms for trimming the top ends of the linotypes, I do not desire to be limited to the precise constructions shown, as I believe I am the first to provide an attachment for a linotype-machine which will cut the ends of the linotypes.

My attachment is designed, primarily, for the common Merganthaler linotype-machines; but it may be used for other types of linotype-machines as well. It may also be used for cutting articles other than linotypes.

Having described my invention, I claim—

1. In a linotype-machine, means for casting linotypes, and a frame having a slot, through which the linotypes are discharged, in combination with a cutter for cutting off the ends of the linotypes.

2. In a linotype-machine, means for casting linotypes, and a frame having a slot, through which the linotypes are discharged, in combination with a cutter for cutting off the ends of the linotypes and adjustable means whereby the linotype may be cut the desired length.

3. In a linotype-machine, means for casting linotypes, and a frame having a slot, through which the linotypes are discharged, in combination with a cutter for cutting off the ends of the linotypes, and an adjustable rest to gage the lengths of the trimmed linotypes.

4. In a linotype-machine, a stick, a cutter for cutting off the ends of the linotypes, a rest to support the linotypes preliminarily to the cutting thereof, and means for storing the trimmed linotypes successively in the stick.

5. In a linotype-machine, a stick, a cutter for cutting the ends of linotypes, an adjustable rest to support the linotypes preliminarily to the cutting thereof, and means for storing the trimmed linotypes successively in the stick.

Signed at Pittsburg this 11th day of June, 1903.

EDWARD B. CLARK.

Witnesses:
A. M. STEEN,
F. N. BARBER.